United States Patent [19]

Ando et al.

[11] Patent Number: 4,690,034
[45] Date of Patent: Sep. 1, 1987

[54] PNEUMATIC BOOSTER

[75] Inventors: Hiromi Ando, Tokyo; Mitsuhiro Endo, Kanagawa; Yukou Ono, Tokyo, all of Japan

[73] Assignee: Tokico Ltd., Kanagawa, Japan

[21] Appl. No.: 713,030

[22] Filed: Mar. 18, 1985

[30] Foreign Application Priority Data

Mar. 19, 1984 [JP] Japan ................................. 59-52844

[51] Int. Cl.⁴ .............................................. F15B 9/10
[52] U.S. Cl. ................................ 91/369 A; 91/369 B; 91/376 R
[58] Field of Search ............. 91/369 B, 369 A, 369 R, 91/376 R; 92/129, 84; 72/110, 522; 192/109 A, 70.27, 70.29

[56] References Cited

U.S. PATENT DOCUMENTS

| | | | |
|---|---|---|---|
| 3,209,658 | 10/1965 | Randol | 91/369 B |
| 3,246,578 | 4/1966 | Randol | 91/369 B |
| 4,259,893 | 4/1981 | Ando et al. | 91/369 B |
| 4,283,911 | 8/1981 | Nakamura et al. | 91/369 A |
| 4,386,554 | 6/1983 | Katagiri et al. | 91/369 B X |
| 4,493,243 | 1/1985 | Horibe | 91/369 B |

Primary Examiner—Robert E. Garrett
Assistant Examiner—Mark A. Williamson
Attorney, Agent, or Firm—Wenderoth, Lind & Ponack

[57] ABSTRACT

A pneumatic booster of the type including a housing, a power piston partitioning the interior of the housing into a constant pressure front chamber and a variable pressure rear chamber, a return spring disposed in the front chamber and biasing the power piston rearwards, a reaction disc mounted on the power piston, an output shaft disposed frontwards of the reaction disc, an input shaft disposed rearwards of the reaction disc, and a valve mechanism associated with the input shaft and controlling the pressure in the rear chamber. A lever is mounted on the front surface of the power piston with radially outer end thereof being biasing against the front surface of the power piston by the return spring and the radially inner end thereof being engageable with the output shaft to transmit at least a part of the output force of the booster from the power piston to the output shaft.

7 Claims, 11 Drawing Figures

PNEUMATIC BOOSTER

BACKGROUND OF THE INVENTION

This invention relates to a pneumatic booster adapted for use in a hydraulic braking system of a vehicle such as an automobile wherein a depressing force applied on a brake pedal is multiplied by utilizing pneumatic pressure.

One prior art pneumatic booster comprises a housing, a power piston partitioning the interior of the housing into a constant pressure front chamber and a variable pressure rear chamber, a return spring disposed in the front chamber and biasing the power piston rearwards, a reaction disc mounted on the power piston, an output shaft disposed frontwards of the reaction disc, an input shaft disposed rearwards of the reaction disc, and a valve mechanism associated with the input shaft and controlling the pressure in the rear chamber. The front chamber is usually connected to a source of vacuum pressure such as an intake manifold of an engine, and atmospheric pressure is introduced into the rear chamber when the valve mechanism is actuated thereby generating a differential pressure between rear and front chambers. The reaction disc acts to transmit the output force from the power piston to the output shaft and, to transmit reaction force of the output force to the input shaft.

A conventional pneumatic booster has so-called "jump-in" characteristics as shown in FIG. 3 such that the output force does not act on the output shaft until the input force increases to a predetermined amount. Such "jump-in" characteristic assures smooth and reliable characteristics of the output force irrespective to such as mechanical loss in the pneumatic booster. Recently, it is desired to increase the amount of "jump-in" so as to improve the feeling on a brake pedal and to increase the initial brake applying force to match the increase in the running speed of the vehicle.

Heretofore, the amount of "jump-in" has been adjusted by changing the clearance between the reaction disc and the forward end of the input shaft, namely, in increasing "jump-in" the clearance was increased. However, when the clearance is increased, the deformation of the reaction disc increases which is hazardous to the durability of the reaction disc.

SUMMARY OF THE INVENTION

The present invention aims to solve the aformentioned problem and, according to the invention, a lever is mounted on the front surface of the power piston with radially outer ends thereof being biased against the front surface of the power piston by the return spring and the radially inner ends thereof being engageable with the output shaft to transmit at least a part of the output force of the booster from the power piston to the output shaft.

Preferably, two or more circumferentially equally spaced levers are provided between the power piston and the output shaft.

Further, a plurality of radial projections having different radii height may be formed on the output shaft for selectively engaging with said radial inner end of said lever, and there may be provided means for rotating the output shaft relative to said lever thereby changing the lever ratio of said lever in a plurality of steps.

Further, a circumferentially extending radial projection may be formed on the circumference of the output shaft for cooperating with the radially inner end of said lever with the radius thereof changing continuously along the circumferential direction, and there may be provided means for rotating the output shaft relative to said lever thereby changing continuously the lever ratio of said lever.

BRIEF EXPLANATION OF THE DRAWINGS

Further objects and advantages of the invention will become apparent from following detailed description taken in connection with the drawings exemplifying some preferred embodiments of the invention, in which.

DETAILED DESCRIPTION OF THE PREFERRED EMBODIMENT

Figure 1:
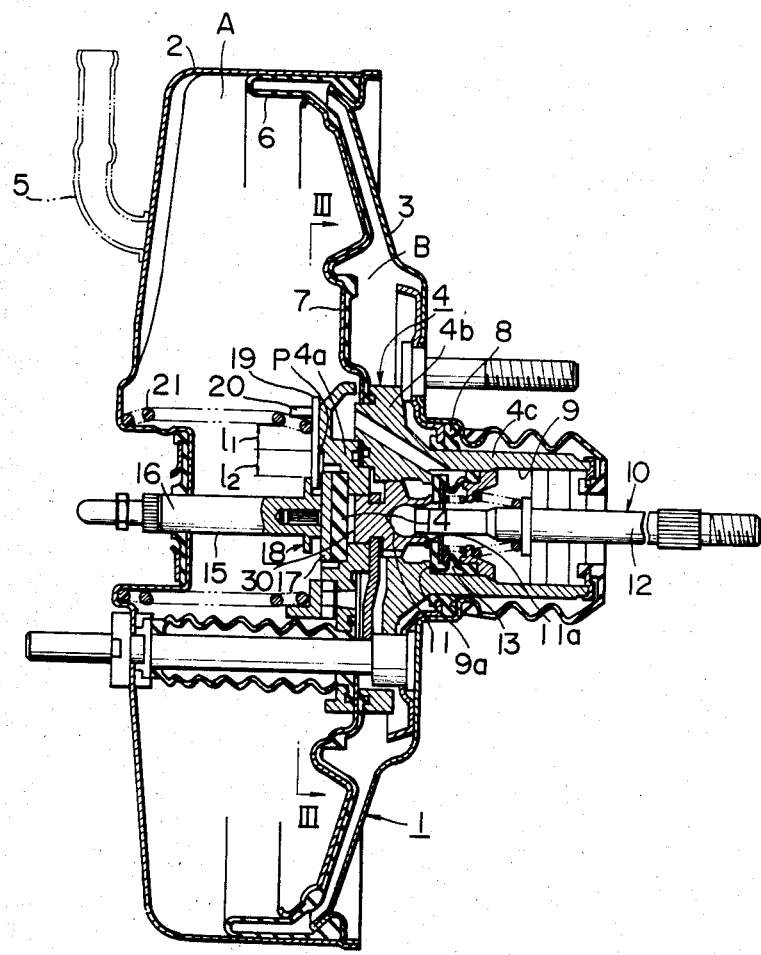
FIG. 1 is a longitudinal sectional view of a pneumatic booster according to a first embodiment of the invention.
Figure 2:
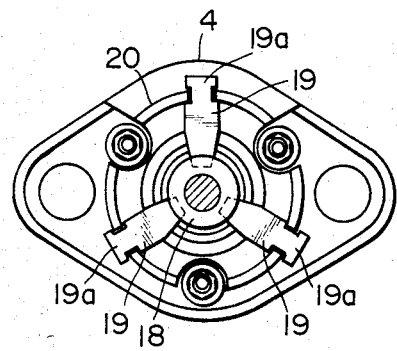
FIG. 2 is a side view as viewed along line III—III in FIG. 1.

The pneumatic booster shown in FIGS. 1 and 2 comprises a housing 1 consisting of a front shell 2 and a rear shell 3, and a power piston 4 displaceably mounted on the rear shell 3 and cooperating with a flexible diaphragm 6 and a piston plate 7 to partition the interior of the housing into a front chamber A and a rear chamber B. The front chamber A is connected permanently with a source of vacuum pressure such as an intake manifold of an engine (not shown) through a connecting pipe 5. The power piston 4 consists of a generally annular front (left side in FIG. 1) member 4a and a rear member 4b connected rigidly thereto. The member 4b has a rearwardly extending small diameter portion 4c which is sealingly and slidably supported on the rear shell 3 through a seal 8. The power piston 4 has a central bore 9 receiving therein an input shaft 10 and a valve mechanism associated therewith. The input shaft 10 consists of an input rod 12 and a plunger 11. The rear end of the input rod 12 projects rearwards of the power piston 4 and is connected to a brake pedal (not shown). The plunger 11 is slidably received in a corresponding diameter portion of the bore 9.

The valve mechanism consists of a poppet valve 13 formed of a resilient material, an annular valve seat 9a formed as a rearwardly facing shoulder in the bore 9, and an annular valve seat 11a formed on the rear end of the plunger 11. The valve mechanism blocks the communication between chambers A and B when the poppet valve 13 seats on the valve seat 9a and blocks the communication between the chamber B and atmospheric pressure when the poppet valve 13 seats on the valve seat 11a. In the embodiment, the atmospheric air can be introduced into the rear chamber B through an opening formed in the rear end of the power piston 4, air cleaners, an annular space between the inner circumference of the poppet valve 13 and the outer periphery of the input rod 12, a clearance formed between the poppet valve 13 and the valve seat 11a, and axial and radial passages formed in the valve body 4.

A reaction disc 14 formed of a resiliently deformable material is mounted in the forward end of the bore 9. In the inactuated condition of the booster, or when no input force is applied on the input shaft 10, a small amount of clearance is formed between the reaction disc 14 and the plunger 11. An output shaft 15 slidably projects through the front shell 2 to the outside of the booster. The output shaft 15 aligns with the input shaft 10. The output shaft 15 consists of a main body 16, a pressure plate 17 having the diameter corresponding to the reaction disc 14, and a flanged ring 18 rigidly connected to and interposed between the main body 16 and the pressure plate 17. The members 16, 17 and 18 may be an integral member.

According to the invention, three plate-like levers 19 are disposed between the front surface of the power piston 4 and the rear surface of flange portion of the ring 18 as shown in FIG. 2. To locate respective levers 19 there is provided on the front surface of the power piston 4 an annular projection having cut-out portions, and reduced width portions on the radially outer end portions of the levers 19 are fitted in respective cut-out portions which are spaced each other by the center angle of 120 degrees respectively. The radially outer end portions of respective levers 19 receives a spring force of a return spring 21 acting between the front shell 2 and the power piston 4. Preferably, the rear surfaces of radially outer halves of levers 19 normally contact with the front surface of the power piston 4 in surface to surface contact fashion by the return spring 21. A generally annular and radially inwardly facing step is formed on the front surface of the power piston 4 to constitute fulcrums P for levers 19. Thus, the radially inner half of each lever 19 is normally spaced from the front surface of the power piston 4. Each lever has a first point of application at a radially outer end portion thereof contacting with the return spring 21 and a second point of application at radially inner end portion thereof contacting with a flange portion of the ring 18. The distance between the first point and the fulcrum P is denoted by $l_1$ and that between the second point and the fulcrum P is denoted by $l_2$ in FIG. 1.

The operation of the pneumatic booster of FIG. 1 will now be explained.

Figure 3:
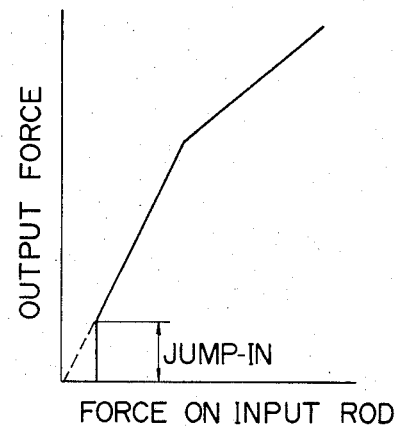
FIG. 3 is a diagram showing "jump-in" characteristics of a pneumatic booster.
Figure 5:
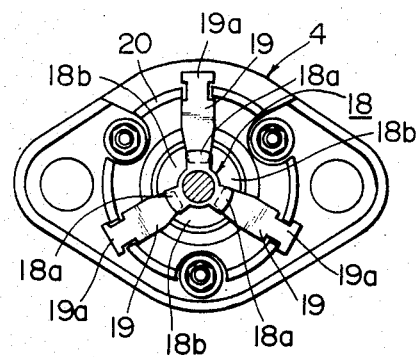
FIG. 5 is a side view as viewed along line V—V in FIG. 4.

In applying brakes, the brake pedal is depressed and the rod 12 displaces forward (leftward in FIG. 1). The valve seat 11a separates from the poppet valve 13 with the valve seat 9a contacting with the poppet valve 13, whereby the communication between chambers A and B is blocked and atmospheric air is introduced into the chamber B. A pressure difference generates between chambers B and A and the power piston 4 moves forward. The output shaft 15 is moved forward and an increased force is transmitted from the output shaft to such as a piston of a master cylinder which is preferably mounted directly on the front surface of the front shell 2. During the forward movement of the output shaft 15, a reaction force acts on the output shaft from the piston of the master cylinder but, in the initial stage, the reaction force is small as compared with the force of the return spring 21, thus, the levers 19 do not pivot around the fulcrums and the reaction disc 14 is not deformed. When the output force increases the reaction force from the master cylinder pivots the levers 19 around the fulcrums P and the reaction disc 14 is deformed. When the reaction disc 14 contacts with the front surface of the plunger 11, a reaction force is transmitted to the input shaft 10. The "jump-in" characteristic is similar to that shown in FIG. 3. The amount of "jump-in" can easily be changed by changing the ratio $l_1/l_2$.

Figure 6:
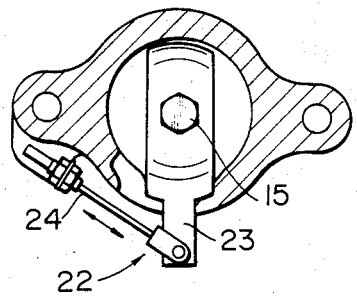
FIG. 6 is a side view as viewed along line VI—VI in FIG. 4.
Figure 4:
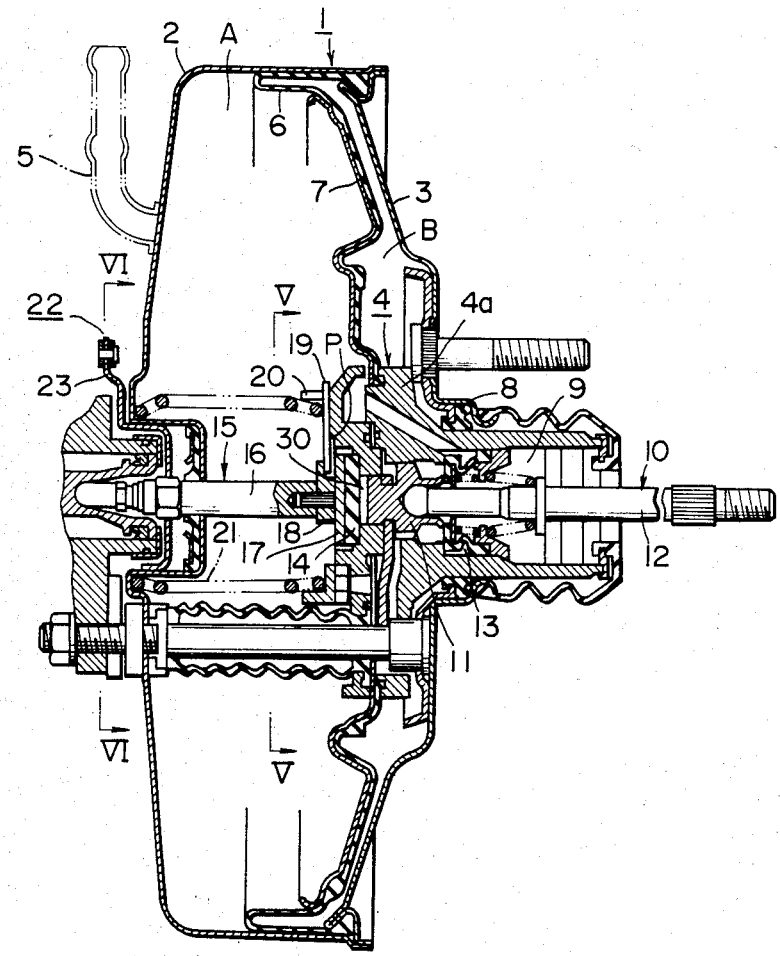
FIG. 4 is a longitudinal sectional view of a second embodiment of the invention.
Figure 7:
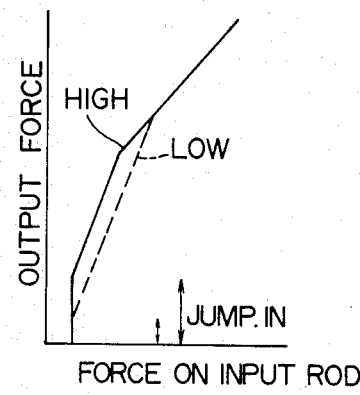
FIG. 7 is a diagram showing the relationship between the output force and the input force of the booster according to the invention.

FIGS. 4–7 show a second embodiment of the invention. In this embodiment, the amount of "jump-in" can be adjusted at two steps. For the end, the flange portion of the ring 18 is formed to have three angularly spaced abutting portions 18a and three angularly spaced cut-out portions 18b, and the ring 18 can selectively be rotated relative to levers 19 so that the relationship between the inner end portions of the levers 19 and the flange portion of the ring 18 can be selected between engaging condition and non-engaging condition. As shown in FIGS. 4 and 6, the output shaft 15 can be rotated by a rotating mechanism 22. The rotating mechanism 22 can rotate the output shaft 15 through a center angle of 60 degrees. When the output shaft 15 is rotated 60 degrees from the condition of FIG. 5, the levers 19 do not engage with the ring 18, and the output force is transmitted to the output shaft 15 through the reaction disc 14 from the initial stage of the actuation of the booster. The clearance 30 between the reaction disc 14 and the plunger 11 is taken up at a relatively early stage of the actuation and "jump-in" characteristics at this condition is shown by broken line of FIG. 7. At the condition of FIG. 5, the levers 19 act similar to the first embodiment and "jump-in" characteristics are shown by solid line in FIG. 7.

The embodiment shown in FIGS. 4–7 is similar to the first embodiment with respect to remaining points and the same reference numerals are applied to corresponding parts.

Figure 9:
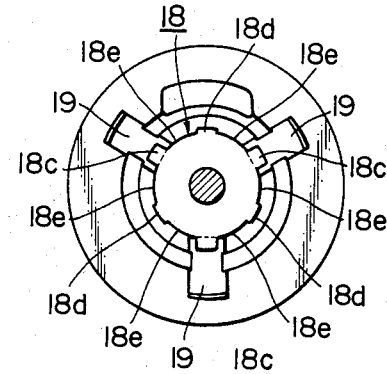
FIG. 9 is a side view as viewed along line IX—IX in FIG. 8.
Figure 10:
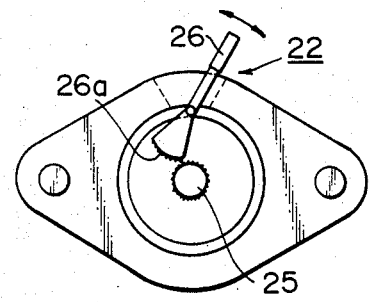
FIG. 10 is a side view as viewed along line X in FIG. 8.
Figure 8:
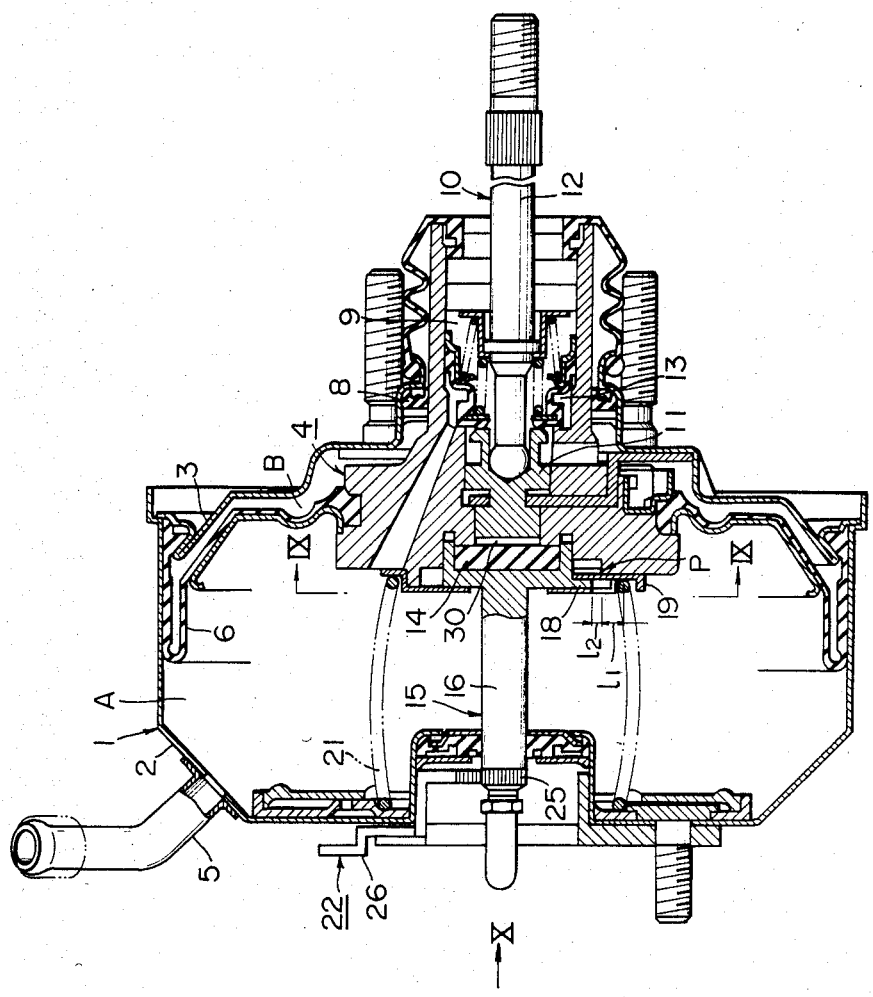
FIG. 8 is a longitudinal sectional view of a third embodiment of the invention.

FIGS. 8–10 show a third embodiment of the invention wherein the amount of "jump-in" can be changed at three steps. Namely, as shown in FIG. 9, the flange portion of the ring 18 is formed to have three first abutting portions 18c projecting radially outwards by relatively large amount, three second abutting portions 18d projecting radially outwards by relatively small amount, and six cut-out portions 18e defined between first and second abutting portions 18c and 18d, which are spaced each other by the center angle of 30 degrees. The output shaft 15 is rotated by rotating mechanism 22 within the range of at least 60 degrees by intervals of 30 degrees. In the embodiment of FIG. 8, the output shaft main body 16, the pressure plate 17 and the ring 18 in the first and second embodiments are integrally formed to constitute the output shaft 15. However, the portion corresponding to the ring 18 in the first and second embodiments is referred to as the ring 18 for convenience of explanation. Further, in this embodiment, the power piston 4 is not divided into a front body and a rear body. The rotating mechanism 22 shown in FIG. 10 comprises a gear teeth portion 25 formed on the forward end portion of the output shaft 15, and a lever 26 having on the inner end thereof a gear teeth portion 26a engaging with the gear teeth portion 25.

When the output shaft 15 is rotated, the inner end portions of respective levers 19 selectively take a first condition abutting with first abutting portions 18c, a second condition facing cut-out portions 18e wherein the levers 19 do not transmit the force to the output shaft 15, and a third condition abutting with the second abutting portions 18d. On the first condition, the length $l_2$ between the fulcrum P and the first abutting portions 18c is decreased, and the force transmitted from the levers 19 to the output shaft 15 is increased and, as the result, the amount of "jump-in" is the maximum. On the third condition, the length $l_2$ is increased and the amount of "jump-in" is medium.

Figure 11:
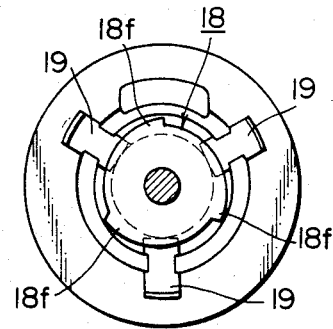
FIG. 11 is a view similar to FIG. 9 but showing a modified form.

FIG. 11 shows a fourth embodiment of the invention. In this embodiment, the height of three abutting portions 18f on the flange portion of the ring 18 change continuously along the circumferential direction so that the lever ratio $l_1/l_2$ can be changed continuously by rotating the output shaft 15.

As described heretofore, the pneumatic booster according to the invention comprises a lever mounted on the front surface of the power piston for transmitting the output force from the power piston to the output shaft at least at the initial stage of the actuation of the booster, thus, it is possible to adjust the reaction force transmitted to the input shaft through the reaction disc, whereby the amount of "jump-in" can be adjusted as desired.

The radially outer end of the lever abuts with the front surface of the power piston in non-actuated condition of the booster, thus, the spring force of the return spring does not act on the output shaft in this condition, which simplifies the assembling operation.

Further, the amount of "jump-in" can selectively be adjusted.

What is claimed is:

1. A pneumatic booster comprising:
   a housing;
   a diaphragm and a power piston coacting to divide the interior of said housing into a constant-pressure front chamber and a variable-pressure rear chamber;
   a valve mechanism positioned in said power piston for controlling the pressure in said rear chamber;
   an input shaft connected to said valve mechanism for actuating said valve mechanism;
   an output shaft in said front chamber for transmitting an output force from said power piston, said output shaft having at least one abutting portion adjacent a rear end thereof, said abutting portion extending radially outward from said output shaft;
   a reaction disc mounted on said power piston on a side of said power piston facing said front chamber, said reaction disc contacting with the rear end of said output shaft in transmitting the output force from said power piston to said output shaft;
   a return spring in said front chamber for biasing said power piston towards said rear chamber;
   a plurality of angularly spaced and radially extending reaction levers having radially inner ends thereof abutting with a rear surface of said abutting portion of said output shaft, lengthwise intermediate portions of said reaction levers engaging with said power piston at fulcrum points on said power piston and radially outer ends of said reaction levers engaging with said return spring, said reaction levers being operable to transmit at least part of the output force from said power piston to said output shaft, said reaction levers transmitting at least part of a reaction force from said output shaft to said input shaft and sasid reaction levers balancing at least part of the reaction force applied to the output shaft with the force of said return spring to thereby prevent at least part of the reaction force from being transmitted to said reaction disc; and
   means for rotating said output shaft to control the point of engagement between said reaction levers and the abutting portion of said output shaft to thereby vary the amount of force transmitted from said power piston to said output shaft.

2. The pneumatic booster of claim 1, wherein said reaction levers comprise three equally angularly spaced reaction levers.

3. The pneumatic booster of claim 1, wherein said at least one abutting portion comprises a plurality of radial projections each of which is engageable with one of said reaction levers and a plurality of cut-off portions between said radial projections each of which is non-engageable with one of said reaction levers whereby the force transmitted from said power piston to said output shaft is varied by actuating said rotation means to bring said plurality of radial projections into or out of engagement with said reaction levers.

4. The pneumatic booster of claim 1, wherein said at least one abutting portion comprises a first plurality of radial projections having a first radius thereof and a second plurality of radial projections having a second radius thereof which is greater than said first radius, each of said first plurality of radial projections being angularly disposed on said output shaft for engaging a respective one of said plurality of reaction levers and each of said second plurality of radial projections being angularly disposed on said output shaft for engaging a respective one of said plurality of reaction levers, whereby the force transmitted from said power piston to said output shaft is varied by actuating said rotation means to selectively bring either said first or said second plurality of projections into engagement with said plurality of reaction levers.

5. The pneumatic booster of claim 1, wherein said at least one abutting portion comprises a circumferentially radially extending projection having portions of continuously increasing radius, each part of said portions of equal radius being angularly disposed on said output shaft for engaging a respective one said plurality of reaction levers, whereby the force transmitted from said power piston to said output shaft is varied by actuating said rotation means to change the radius of the point of contact on said portions of said radially extending projection in engagement with said plurality of levers.

6. The pneumatic booster of claim 1, wherein said fulcrum points on said power piston are located at the edge of a radially inwardly facing stp formed on the front surface of said power piston.

7. The pneumatic booster of claim 1, wherein an annular projection is disposed on the front surface of said power piston, said annular projection having a plurality of cut-out portions, each of whicch receives a respective one of said reaction levers, each oif said reaction levers having a reduced width portion on a radially outer end thereof fitted in a repsective cut-out portion of said annular projection on said power piston.

* * * * *